United States Patent [19]
Fujita et al.

[11] Patent Number: 5,712,862
[45] Date of Patent: Jan. 27, 1998

[54] ERROR DETECTION SYSTEM FOR DIGITAL DATA TRANSMISSION MULTIPLEXING SYSTEM

[75] Inventors: Yoshitaka Fujita, Tokyo; Yasushi Ono, Miyagi, both of Japan

[73] Assignee: NEC Corporation, Tokyo, Japan

[21] Appl. No.: 394,630

[22] Filed: Feb. 27, 1995

[30] Foreign Application Priority Data

Jun. 18, 1993 [JP] Japan .................................. 5-147536

[51] Int. Cl.⁶ ...................................... H04J 3/14
[52] U.S. Cl. .............................. 371/49.1; 370/248
[58] Field of Search ........................ 371/49.1, 49.3; 370/13, 14, 241, 248

[56] References Cited

U.S. PATENT DOCUMENTS

| | | | |
|---|---|---|---|
| 5,086,438 | 2/1992 | Sugata et al. | 375/114 |
| 5,189,410 | 2/1993 | Kosugi et al. | 340/825.14 |
| 5,210,762 | 5/1993 | Weeber et al. | 371/69.1 |
| 5,265,096 | 11/1993 | Parruck | 370/110.1 |
| 5,430,659 | 7/1995 | Miller | 364/484 |
| 5,453,989 | 9/1995 | Kitayama et al. | 370/110.1 |
| 5,471,476 | 11/1995 | Hiramoto | 370/105.1 |
| 5,541,931 | 7/1996 | Lee | 370/112 |
| 5,555,248 | 9/1996 | Sugawara | 371/5.1 |
| 5,572,515 | 11/1996 | Williamson et al. | 370/17 |
| 5,600,648 | 2/1997 | Furuta et al. | 370/248 |

Primary Examiner—Stephen M. Baker
Attorney, Agent, or Firm—Whitham, Curtis, Whitham, & McGinn

[57] ABSTRACT

It is an object to efficiently detect and analyze an error occurring on a channel of a digital data transmission multiplexing system with a small circuit scale and a low power consumption. A TU aligner for setting an AU pointer value to zero such that a J1 byte floating in an STM-1 signal is located next to the right one of three H3 bytes in an SOH and changing pointer values (V1 and V2) in each TU channel signal is arranged, and an error which is determined by analyzing each channel signal in the STM-1 signal processed by the aligner and a V5 byte as the POH byte in the signal is detected without demultiplexing the multiplexed STM-1 signal in units of TU channels and which is reported by means of an alarm.

4 Claims, 5 Drawing Sheets

ERROR DETECTION SYSTEM FOR DIGITAL DATA TRANSMISSION MULTIPLEXING SYSTEM

BACKGROUND OF THE INVENTION

1. Field of the Invention

The present invention relates to an error detection system for detecting and analyzing an error occurring on a channel of a digital data transmission multiplexing system.

2. Description of the Prior Art

Along with extension of international digital communication networks, the CCITT (The International Telegraph and Telephone Consultative Committee) has recommended the SDH (Synchronous Digital Hierarchy) as a rule for hierarchically multiplexing channels in signal multiplexing for digital communication, to achieve interconnection of digital communication. In the SDH, a module called an STM (Synchronous Transfer Module) is multiplexed to perform digital communication. The CCITT has recommended three STMs such as an STM-1 (synchronous transfer module-level 1 with a bit rate of 155,520 Kb/s), an STM-4 (synchronous transfer module level-4 with a bit rate of 622,080 Kb/s), and an STM-16 (synchronous transfer module level-16 with a bit rate of 2,488,320 Kb/s). In correspondence with these recommendations, the TTC (The Telecommunication Technology Committee) has regulated an STM-0 (Synchronous transfer module level-0 with a bit rate of 51,840 Kb/s) as a lower level of the STM-1, an STM-8 (synchronous transfer module level-8 with a bit rate of 1,244,160 Kb/s), and an STM-12 (synchronous transfer module level-12 with a bit rate of 1,866,240 Kb/s). Each of the STM-0 to STM-16 is referred to as an STM-N, and the frame of the STM-N is referred to as an STM frame hereinafter.

As shown in FIG. 1, a conventional error detection system for a TU channel in a synchronous transfer module level-1 (STM-1) signal has an 8-demultiplexer 101 for 8-demultiplexing an octet-multiplexed STM-1 signal 111 in units of bits, a 63-demultiplexer 201 for receiving eight signals 211 which are 8-demultiplexed, a frame signal 212 representing the frame start timing of the signals 211, and a destuff pulse signal 213 for absorbing a difference between the frequency of the STM-1 signal 111 and that of the error detection system from the demultiplexer 101 and 63-demultiplexing the signals in units of TU channels (in this case, the TU-12 is exemplified as STM-1=63×TU-12), 63 error analyzers 301 to 363 for performing a parity calculation (in this case, a BIP-2 calculation described in the CCITT Recommendation G709, 4.2) of main signals for signals 3101 to 3163 demultiplexed in units of TU-12 channels and the TU-12 signals of the signals 3101 to 3163 in accordance with a signal representing the V5-byte appearance timing for each signal, comparing the calculation result with BIP-2 data in the V5 bytes, and generating and outputting signals 4101 to 4163 representing whether an error is present in that frame, and an alarm collector 401 for receiving and totalizing the analysis results.

In the conventional error detection system, the STM-1 signal is demultiplexed in units of TU channels to detect and analyze an error. For this reason, the 63 detectors, i.e., the sixty three error analyzers 301 to 363 with the same arrangement are needed. If detection at a very low error rate (e.g., $10^{-8}$ or $10^{-9}$) is to be performed, sampling must be performed for a long time. For this reason, much time (several minutes) is required, and the scale of one circuit becomes large. Since there are sixty three (63) circuits, the entire circuit scale becomes very large. Power to be consumed by these circuits increases accordingly, resulting in difficulty in efficient error analysis.

SUMMARY OF THE INVENTION

According to the present invention, there is provided an error detection system comprising a demultiplexer for demultiplexing an octet-multiplexed signal in units of bits when a channel signal error in the multiplexed signal of a digital transmission multiplexing system is to be detected, a TU aligner for setting an AU pointer value to zero such that a J1 byte in a POH (Path Overhead) of a VC4 signal floating in the demultiplexed multiplexed signal is located next to a right one of three H3 bytes in an SOH (Section Overhead) and Changing pointer values (V1 and V2) in each TU channel signal, and an error detector for detecting an error which is determined by analyzing each channel signal in an STM-1 signal processed by the TU aligner and a V5 byte as the POH byte in the signal without demultiplexing the multiplexed STM-1 signal in units of TU channels and reporting the error by means of an alarm.

DETAILED DESCRIPTION OF PREFERRED EMBODIMENT

Figure 1:
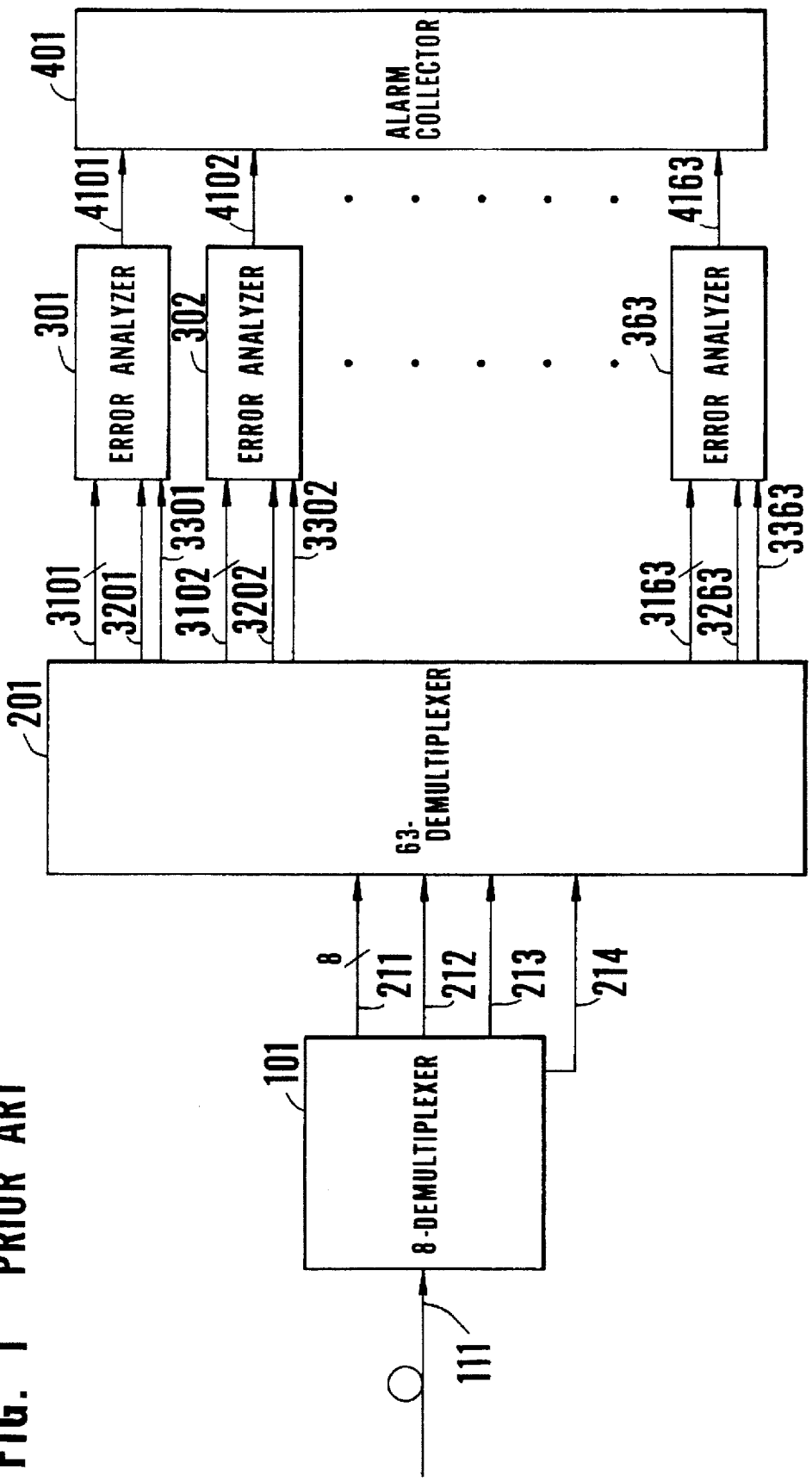
FIG. 1 is a block diagram showing a conventional error detection system.
Figure 2:
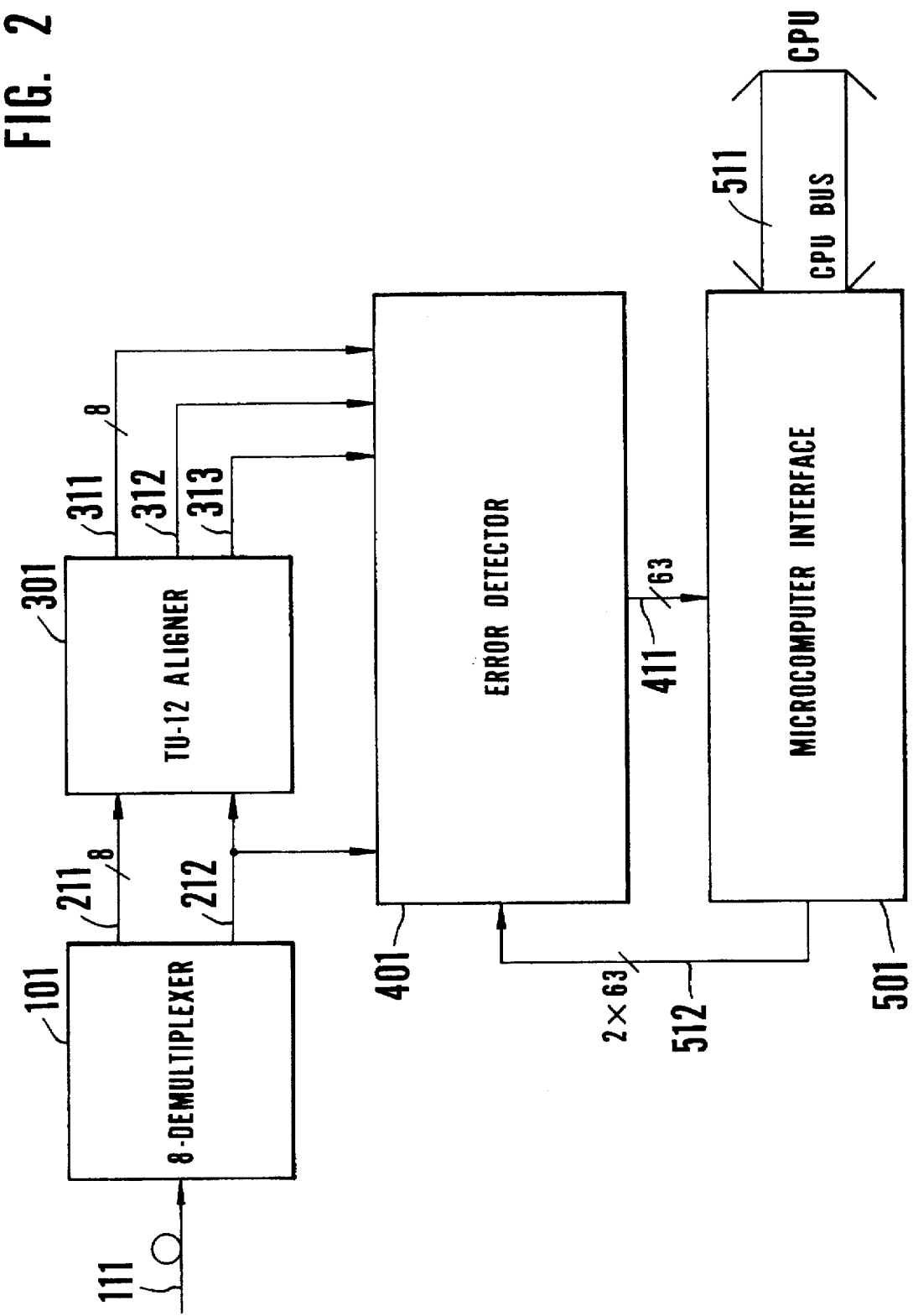
FIG. 2 is a block diagram showing an error detection system according to an embodiment of the present invention.
Figure 3:
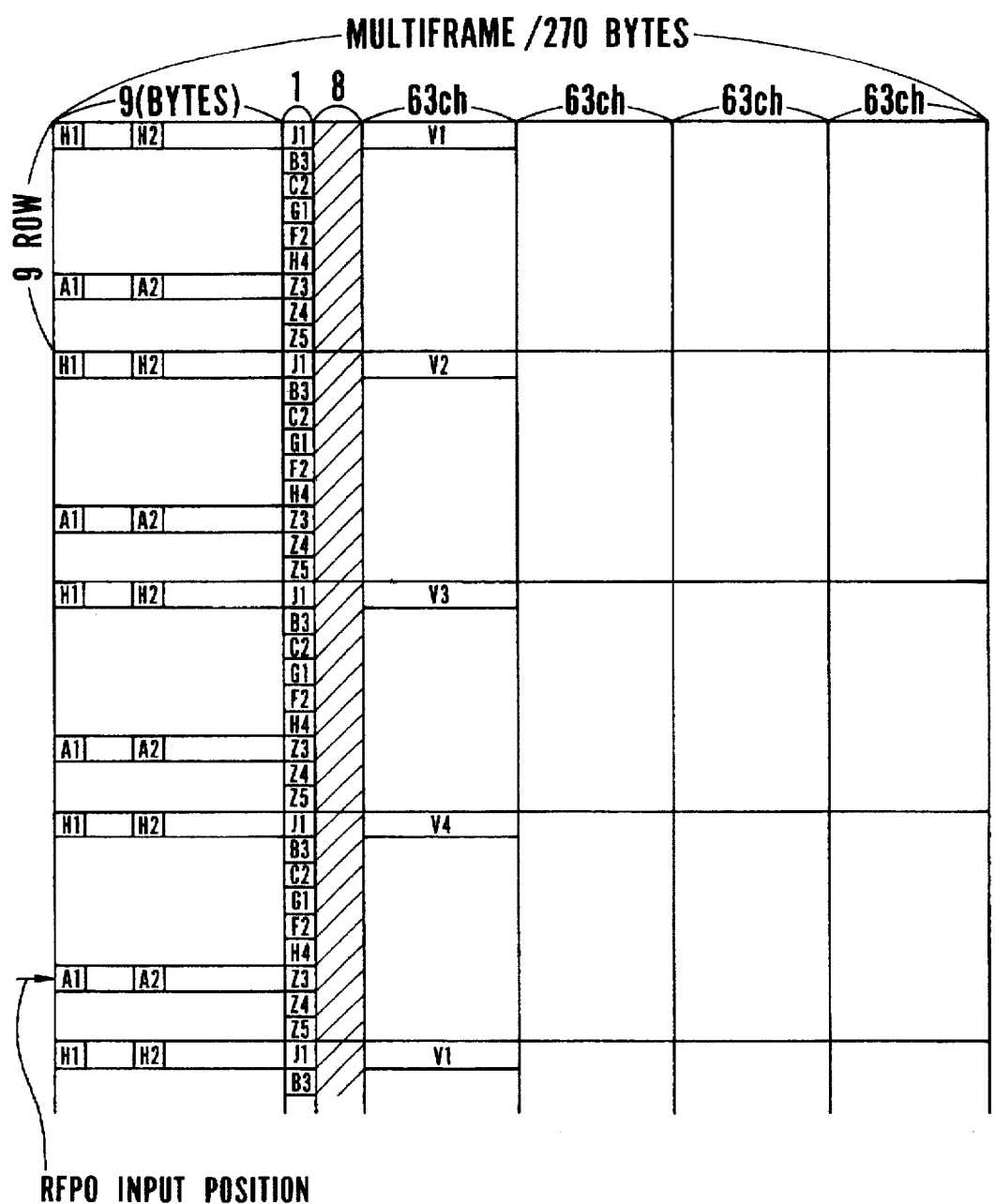
FIG. 3 is a view showing the arrangement of a signal frame of the error detection system according to the embodiment of the present invention.

FIG. 2 is a block diagram showing an error detection system according to an embodiment of the present invention. A 19-Mbps (mega bit per second) signal or 19M (mega) data 311 aligned to have no negative or positive value in the management unit AU4 level and to have a byte J1 corresponding to a pointer value of 0 is output from a TU-12 aligner 301. At the same time, a frame signal 312 (RFPO signal) which is set active at a timing corresponding to the A1-byte position (FIG. 3) as the start position of a frame having a V1 byte, and a DOV5 signal 313 which is set active 36 times in one multiframe by time division at the V5-byte position (the V5 byte is floating in the TU channel) in each TU channel of a main signal are output.

Figure 4:
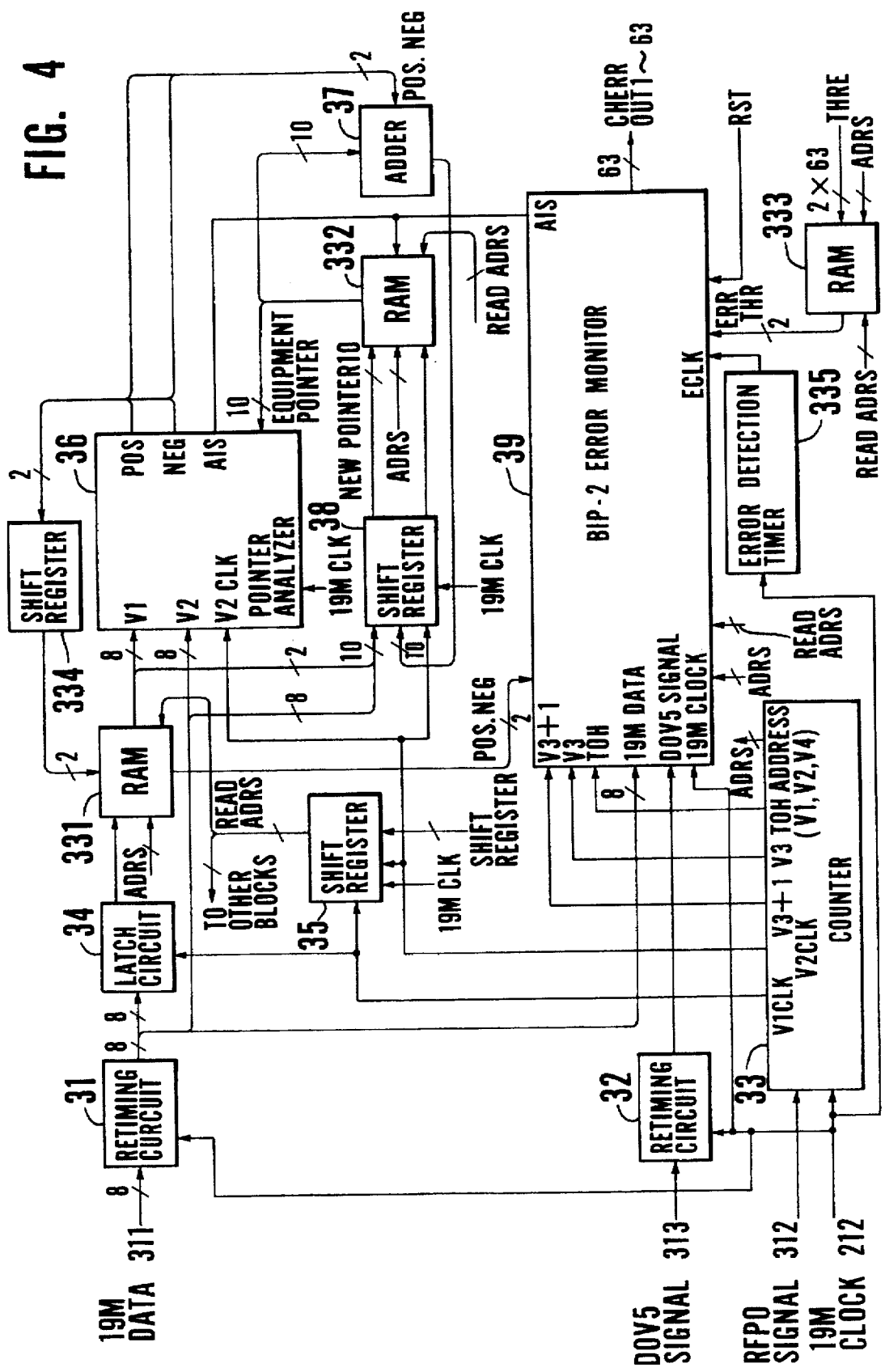
FIG. 4 is a block diagram showing the error detection system according to the embodiment of the present invention.

FIG. 4 is a circuit diagram showing an arrangement of an error detector 401 of this embodiment. The 19M data 311 and the DOV5 signal 313 are retimed (phase-locked) in retiming circuits 31 and 32. The RFPO signal 312 is used as a trigger to frequency-divide a 19-mega clock, i.e., 19M clock 212 in a counter 33, so that a V1CLK signal for latching the V1 (63-channel data) bytes of the multiframe shown in FIG. 3, a V2CKL signal for latching V2 (63-channel data) bytes, a TOH signal which is set active "H" so as to exclude the bytes in a V5BIP-2 calculation at the V1, V2, and V4 positions of the 63-channel data, a V3 signal which is set active "L" at the V3-byte position of the 63-channel data so as to include V5 in the BIP-2 (parity) calculation because the TU-12 has a negative stuff and data is inserted at the V3-byte position, a (V3+1) signal which is set active "H" at the (V3+1) position of the 63-channel data so as to exclude (V3+1) bytes in the parity calculation because the TU-12 has a positive stuff and dummy data is inserted at a byte position ((V3+1) position) subsequent to the V3 byte, and an ADRS signal as an address signal to dual-port RAMs 331 to 333 are generated. The 19M data 311 retimed in the retiming circuit 31 is latched at only the V1 byte in a latch circuit 34. The latched V1 byte is stored in the RAM 331 in accordance with the ADRS signal which is generated by the counter 33 and timing-adjusted by a shift register 35. The RAM 331 sequentially stores the V1 bytes of the 63-channel data starting from channel 1. The V2 byte positions of the 63 channels in the multiframe are sequentially supplied to the error detector 401 starting from channel 1, and the V2 bytes are retimed in the retiming circuit 31 as in the V1 bytes. When the V2 byte of channel 1 is supplied to a pointer analyzer 36, the V1 byte of channel 1 is read out from the RAM 331. Both the V1 and V2 bytes of the channel 1 are analyzed in the pointer analyzer 36 until all the 63-channel data are analyzed. This analysis is performed for three signal states as a positive stuff, a negative stuff, and an alarm indication signal (AIS) by comparing the pointer value in the device, which is read out from the RAM 331, with the new pointer values received as the V1 and V2 bytes. In accordance with a POS signal (set active when a positive stuff is present) and an NEG signal (set active when a negative stuff is present) from the pointer analyzer 36, an adder 37 outputs a value obtained by adding/subtracting one to/from the current pointer value in the device when the a positive or negative stuff is present. A shift register 38 selects 10 bits representing a new pointer value in the device when no stuff is present, or the value directly received from the adder when a stuff is present. The new pointer values of the 63-channel data are sequentially written in the RAM 332 in phase-locked with the ADRS signal.

The actual BIP-2 (parity) calculation will be described below. This calculation is performed in a BIP-2 error monitor 39.

Figure 5:
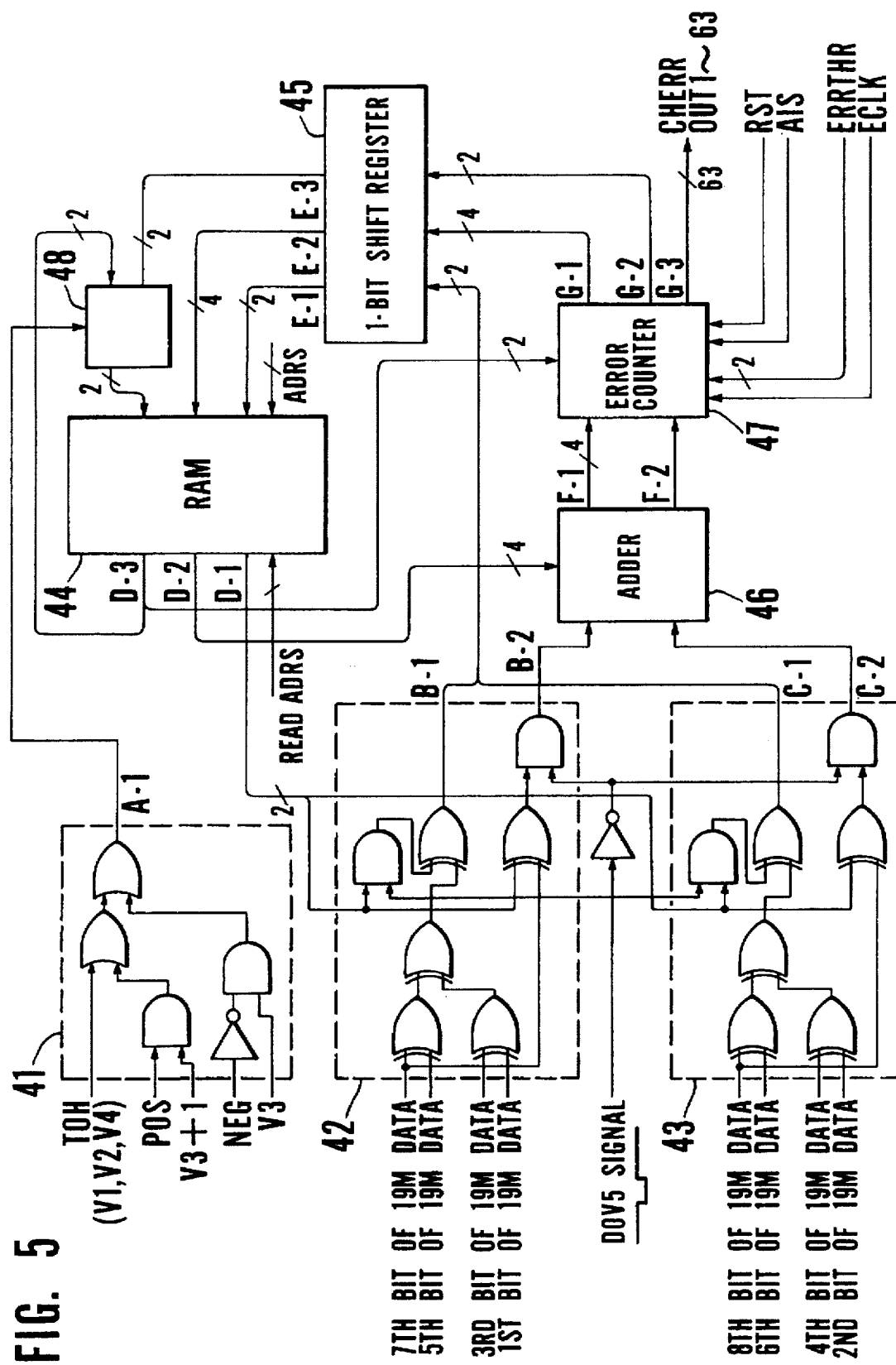
FIG. 5 is a block diagram showing the error detection system according to the embodiment of the present invention.

FIG. 5 is a circuit diagram showing an arrangement of the BIP-2 error monitor 39. To this circuit, the data retimed in the retiming circuits 31 and 32 in FIG. 4, the 19M clock 212, the POS or NEG signal which is supplied from the RAM 331 to determine whether each TU channel in the multiframe has a positive or negative stuff, the AIS signal representing whether each TU channel in the multiframe has an AIS, an ECLK signal which is output from an error detection timer 335 (FIG. 4) for setting a predetermined time for each TU channel and periodically resetting an error counter 47 which accumulates errors during that time, and a threshold value level (its setting changes for each TU channel), corresponding to two bits (as an ERRTHR signal), for determining the error rate of each TU channel are read out from the RAM 333 by time division. In the circuit shown in FIG. 5, the 8-bit data is divided into two bit strings as odd bit strings and even bit strings. The string of four odd bits (7th, 5th, 3rd, and 1st bits of the 19M data) are compared with the first bit (7th bit) of the BIP-2 in the V5 byte in an odd bit calculating circuit 42. A method of calculating 2 bits of the BIP-2 in the 5 V byte for the string of four even bits (8th, 6th, 4th, and 2nd bits of the 19M data) in an even bit calculating circuit 43 is defined in the CCITT Recommendation G709, 4.2. In the odd and even bit calculating circuits 42 and 43, the DOV5 signals which are 63-channel-multiplexed are input to the V5 byte positions, and the contents at the V5 byte positions are cleared, respectively.

A description will be made from the cleared state of channel 1. In accordance with a reset (RST) signal from a microcomputer (CPU), values such as a counter value (15 errors can be counted at maximum because the counter value is expressed by four bits) representing the number of errors in the error counter 47, the number of stages of errors (representing the number of times of detection consisting of 15 errors, and three stages can be counted at maximum because the value is expressed by two bits) are reset to zero. These values are supplied to a 1-bit shift register 45, shifted bit by bit, and written in a RAM 44. In the initial state, values of 0 are written in the RAM 44, an adder 46, and the error counter 47, and all of them are cleared. When the RST signal is disabled to set an operative state from the initial state, and a signal of level "L" is supplied from channel 1 to the odd and even bit calculating circuits 42 and 43, from the V5 byte, data D-1 (zero) read out from the RAM 44 and data of 7th and 8th bits of the 19M data (data of 1st and 2nd bits of the BIP-2, which has an initial value of 0) are exclusively ORed and supplied to the adder 46 as B-2 and C-2 signals, respectively. At the same time, a value of 0 is read out from the RAM 44 as a D-2 signal, so that a value of 0 is eventually written in the adder 46. A value of 0 as an F-1 signal and a value of 0 as an F-2 signal (this bit is set to "1" when the number of errors exceeds 15) are output to the error counter 47. Values accumulated so far are output from the error counter 47 to the 1-bit shift register 45 as a G-1 signal and a G-2 signal (representing the number of "1"s input as the F-2 signal, i.e., the number of times of detection consisting of 15 or more errors). The result of the BIP-2 calculation at that time (the V5 byte position of the channel 1) is simultaneously written in the 1-bit shift register 45 as B-1 and C-1 bits. The B-1 and C-1 bits are shifted by one bit together with the G-1 and G-2 bits and written in the RAM 44. When these bits are shifted by one bit by the 1-bit shift register 45, the data of channel 2 is supplied to the odd and even bit calculating circuits 42 and 43. The BIP-2 calculation is performed as for channel 1, and the same operation is performed. However, since the channels in the TU-12 data do not necessarily have the same V5 byte position, no bit is written in the adder 46 and the error counter 47 when the V5 byte is not present (i.e., when the DOV5 signal is not set active "L"). In this manner, processing for channels 1 to 63 is sequentially performed. When data is inserted at the V1-, V2-, V3-, and V4-byte positions in the TU-12 (when a negative stuff is present), or when dummy data is inserted at the V3-byte position and the subsequent (V3+1)-byte position (when a positive stuff is present), the BIP-2 calculation must not be performed. For this reason, an accumulation inhibition controller 41 outputs a control signal A-1 to a selector 48 not to select data E-3 output from the 1-bit shift register 45, and a calculation result D-3 is written in the RAM 44 again and held.

The continuous operation (sequential operation) for channels 1 to 63 is performed in this manner. On the other hand, when the V5 byte of each channel is detected, i.e., every time the DOV5 signal is received, a new error is added to the number of errors (supplied from the RAM 44) in the adder 46. When the number of errors exceeds a predetermined count K (15 in this embodiment), the F-2 signal is set active and output to the error counter 47. The error counter 47 counts three F-2 signals at maximum and outputs the count as the G-2 signal of two bits. When the number of errors during the sampling time which is determined by the ECLK signal in accordance with the threshold value level ERRTHR (2 bits) read by time division and set by the microcomputer exceeds a set value (K×3 in this case), CH ERR OUT signals 1 to 63 for the channels (1 to 63) are set active and output to a microcomputer interface 501 (FIG. 2), thereby informing the microcomputer (CPU) through a CPU BUS 511 that the number of errors exceeds the set value. In this calculation, if a TU-AIS is generated in one of channels 1 to 63, the error counts G-1 and G-2 of that channel are cleared during the generation time of the TU-AIS.

As described above, in this embodiment, error analysis is performed in the multiplexed state without demultiplexing the 63-channel data.

As has been described above, according to the present invention, error analysis for comparing BIP-2 bits at the V5 byte of a TU-12 signal in the 63-channel data of the STM-1 with other main signal bytes is not executed after 63-channel demultiplexing. Instead, the error analysis can be performed in the multiplexed state. For this reason, the error state of each channel can be analyzed with a small circuit scale and a low power consumption.

Although the STM-1 has been exemplified in this embodiment, the present invention is not limited to the embodiment and can also be applied to an STM-N.

What is claimed is:

1. An error detection system for a digital transmission multiplexing system comprising:

a TU aligner positioned at a signal receiver side, for setting an AU pointer value to zero such that all byte in a POH (Path Overhead) of a VC4 signal floating in a multiplexed signal is located next to a rightward one of three H3 bytes in an SOH (Section Overhead) and also next to changing pointer values (V1 and V2) in each TU channel signal; and an error detector for detecting an error which is determined by analyzing each channel signal in an STM-N signal processed by said TU aligner and a V5 byte as the POH byte in the signal without demultiplexing the multiplexed STM-N signal in units of TU channels and for reporting the error as an alarm.

2. An error detection system for a digital transmission multiplexing system comprising:

a TU aligner, positioned at a signal receiver side, for setting an AU pointer value to zero such that a J1 byte in a POH (Path Overhead) of a VC4 signal floating in a multiplexed signal is located next to a rightward one of three H3 bytes in an SOH (Section Overhead) and also next to changing pointer values (V1 and V2) in each TU channel signal; and an error detector for detecting an error which is determined by analyzing each channel signal in an STM-1 signal processed by said TU aligner and a V5 byte as the POH byte in the signal without demultiplexing the multiplexed STM-1 signal in units of TU channels and for reporting the error as an alarm.

3. An error detection system for a digital transmission multiplexing system comprising:

a demultiplexer for demultiplexing an octet-multiplexed signal in units of bits when a channel signal error in the multiplexed signal of said digital transmission multiplexing system is to be detected;

a TU aligner for setting an AU pointer value to zero such that a J1 byte in a POH (Path Overhead) of a VC4 signal floating in the demultiplexed signal is located next to a rightward One Of three H3 bytes in an SOH (Section Overhead) and also next to changing pointer values (V1 and V2) in each TU channel signal; and an error detector for detecting an error which is determined by analyzing each channel signal in an STM-N Signal processed by said TU aligner and a V5 byte as the POH byte in the signal without demultiplexing the multiplexed STM-N Signal in units of TU Channels and for reporting the error as an alarm, wherein said error detector includes a BIP-2 error monitor for performing a BIP-2 parity calculation for each of odd and even bits of the multiplexed signal and processing and outputting a calculation result for each of said TU channels.

4. An error detection system for a digital transmission multiplexing system comprising:

a demultiplexer for demultiplexing an octet-multiplexed signal in units of bits when a channel signal error in the multiplexed signal of said digital transmission multiplexing system is to be detected;

a TU aligner for setting an AU pointer value to zero such that a J1 byte in a POH (Path Overhead) of a VC4 signal floating in the demultiplexed signal is located next to a rightward one of three H3 bytes in an SOH (Section Overhead) and also next to changing pointer values (V1 and V2) in each TU channel signal; and an error detector for detecting an error which is determined by analyzing each channel signal in an STM-1 Signal processed by said TU aligner and a V5 byte as the POH byte in the signal without demultiplexing the multiplexed. STM-1 Signal in units of TU Channels and for reporting the error as an alarm, wherein said error detector includes a BIP-2 error monitor for performing a BIP-2 parity calculation for each of odd and even bits of the multiplexed signal and processing and outputting a calculation result for each of said TU channels.

* * * * *